(12) United States Patent
Tenaglia et al.

(10) Patent No.: US 11,436,310 B1
(45) Date of Patent: Sep. 6, 2022

(54) BIOMETRIC KEYSTROKE ATTRIBUTION

(71) Applicant: Two Six Labs, LLC, Arlington, VA (US)

(72) Inventors: Scott D. Tenaglia, Arlington, VA (US); Sean Morgan, Arlington, VA (US); David Slater, Arlington, VA (US)

(73) Assignee: Two Six Labs, LLC, Arlington, VA (US)

( * ) Notice: Subject to any disclaimer, the term of this patent is extended or adjusted under 35 U.S.C. 154(b) by 133 days.

(21) Appl. No.: 16/933,153

(22) Filed: Jul. 20, 2020

(51) Int. Cl.
*G06F 21/32* (2013.01)
*G06F 21/55* (2013.01)
*H04L 9/40* (2022.01)
*H04L 9/32* (2006.01)

(52) U.S. Cl.
CPC ............ *G06F 21/32* (2013.01); *G06F 21/552* (2013.01); *H04L 9/3231* (2013.01); *H04L 63/0861* (2013.01); *H04L 63/1416* (2013.01)

(58) Field of Classification Search
CPC .............................. G06F 21/32; G06F 21/552
See application file for complete search history.

(56) References Cited

U.S. PATENT DOCUMENTS

| | | | | |
|---|---|---|---|---|
| 9,430,626 B1* | 8/2016 | Rome | ...................... | G06F 21/32 |
| 10,572,778 B1* | 2/2020 | Robinson | ................. | G06F 9/542 |
| 10,846,434 B1* | 11/2020 | Ben-Zvi | .................. | G06Q 50/01 |
| 2011/0231935 A1* | 9/2011 | Gula | ...................... | H04L 43/028 |
| | | | | 726/25 |
| 2012/0098750 A1* | 4/2012 | Allen | ...................... | G06F 3/023 |
| | | | | 345/169 |
| 2015/0205955 A1* | 7/2015 | Turgeman | ........... | H04W 12/125 |
| | | | | 726/7 |
| 2015/0372984 A1* | 12/2015 | Kacmarcik | ......... | H04L 63/0428 |
| | | | | 726/22 |
| 2018/0349583 A1* | 12/2018 | Turgeman | ............. | G06F 21/554 |
| 2019/0332756 A1* | 10/2019 | Khitrov | .................... | G10L 17/00 |
| 2020/0019635 A1* | 1/2020 | Poirel | .................... | G06F 16/215 |
| 2020/0057706 A1* | 2/2020 | Rome | ..................... | G06N 20/00 |

(Continued)

OTHER PUBLICATIONS

Song, et al., "Timing Analysis of Keystrokes and Timing Attacks on SSH", 2001, pp. 1-17, Aug. 13-17, 2001, pp. 1-17, Usenix Association vol. 10.

(Continued)

*Primary Examiner* — Joseph P Hirl
*Assistant Examiner* — Stephen T Gundry
(74) *Attorney, Agent, or Firm* — Armis IP Law, LLC

(57) ABSTRACT

A biometric attribution approach identifies a keyboard actor based on timing between entered keystrokes. Patterns tend to emerge in a timing interval between keystrokes entered by an actor. The keystroke patterns of an actor are analyzed to compute a signature exhibited by the actor. Gathered or intercepted keystroke patterns of an unknown actor are compared to identify a likelihood that typing sessions emanated from a common actor. Keystroke activity of a purported suspect actor can be compared to a database or model of keystroke attributes for determining if the keystroke activity emanated from the same actor as other keystroke sequences. Keystroke patterns rely only on the timing between keystrokes, as key data and upstroke information need not be gathered since the comparisons reply only on keystroke timing deltas.

16 Claims, 11 Drawing Sheets

(56) References Cited

U.S. PATENT DOCUMENTS

| | | | |
|---|---|---|---|
| 2020/0244639 A1* | 7/2020 | Arif Khan | G06N 3/08 |
| 2020/0351657 A1* | 11/2020 | Wentz | H04L 63/0807 |
| 2020/0356665 A1* | 11/2020 | Denney | G06N 5/04 |
| 2020/0387594 A1* | 12/2020 | Sandstrom | G06F 21/46 |
| 2021/0038159 A1* | 2/2021 | Giancardo | A61B 5/7246 |
| 2021/0110014 A1* | 4/2021 | Turgeman | G06F 21/554 |
| 2021/0182369 A1* | 6/2021 | Slipenchuk | G06F 3/02 |
| 2021/0236044 A1* | 8/2021 | Arroyo-Gallego | A61B 5/4803 |

OTHER PUBLICATIONS

Monaco, et al. "Behaviorial Biometric Verification of Student identity in Online Course Assessment and Authentication of Authors in Literary Works", 2013, pp. 1-8, IEEE 6th International Conference on Biometrics, BTAS 2013.

\* cited by examiner

|  | 502 | 504 | 506 | 508 |
|---|---|---|---|---|
| 501 → | age | square footage | location | price |
|  | 5 | 1500 | 5 | 480 |
|  | 11 | 2030 | 12 | 1090 |
|  | 14 | 1442 | 6 | 350 |
|  | 8 | 2501 | 4 | 1810 |
|  | 12 | 1300 | 9 | 400 |
|  | 10 | 1789 | 11 | 500 |

(rows above braced as 510)

*FIG. 5A*

| 530 → age | square footage | location | price | residuals |
|---|---|---|---|---|
| 5 | 1500 | 5 | 480 | -208 |
| 11 | 2030 | 12 | 1090 | 402 |
| 14 | 1442 | 6 | 350 | -338 |
| 8 | 2501 | 4 | 1810 | 622 |
| 12 | 1300 | 9 | 400 | -283 |
| 10 | 1789 | 11 | 500 | -188 |

*FIG. 5B*

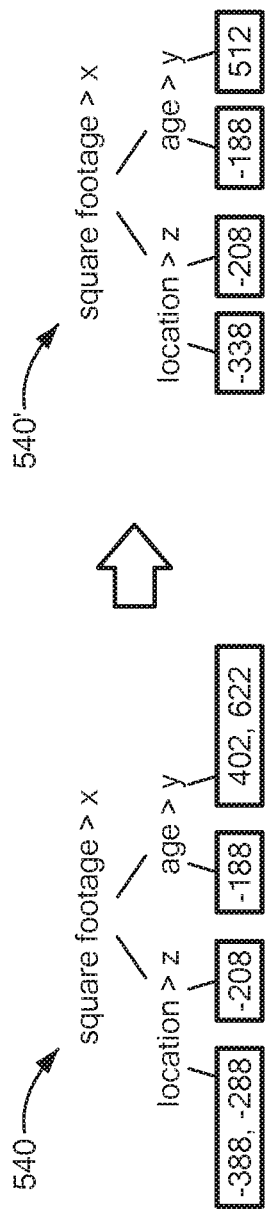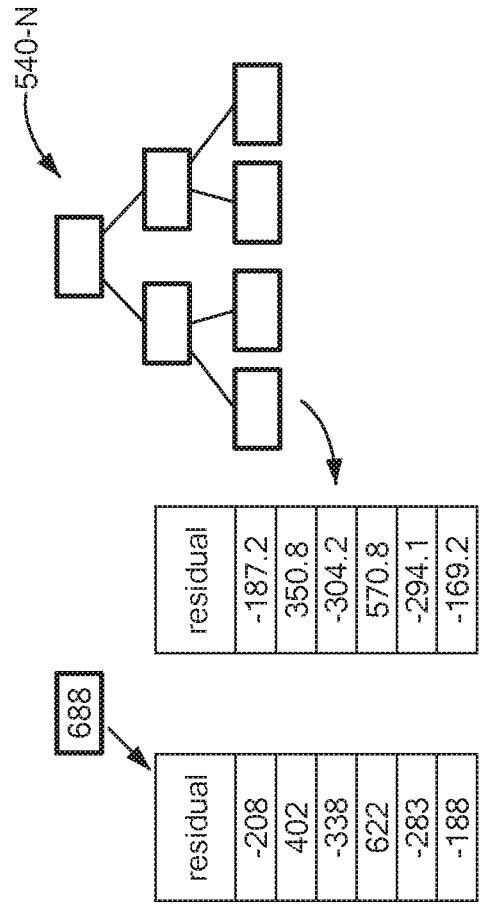
FIG. 5C
FIG. 5D

BIOMETRIC KEYSTROKE ATTRIBUTION

STATEMENT REGARDING FEDERALLY SPONSORED RESEARCH AND DEVELOPMENT

This invention was made with government support under contract no. FA8750-17-C-0015 awarded by the United States Government. The Government has certain rights in the invention.

BACKGROUND

Detection of bad actors in an information system is often focused on an entry point to that system. Most electronic network devices provide a form of user authentication to control access to the device. Passwords are a common authentication mechanism because of their simplicity and ease of validating a user's identity though a simple string match, but rely on keeping the password string a secret. An unauthorized actor need only obtain the password to masquerade as the user.

Biometric features may be employed as an alternate authentication mechanism, as they rely on inherent personal features that are difficult or impossible to replicate, steal, or falsify. Values based on fingerprints, voice, retinal scans and similar personal characteristics have been employed, but tend to impose additional complexity and cost into the authentication process, and are therefore not widely employed.

Both biometric and token based approaches have limitations. Cyber criminals often carry out attacks through encrypted tunnels behind a network of proxy computers which makes attributing the perpetrator of a crime very difficult to do. However, if authentication fails or is emulated by a malicious actor, subsequent activity may be identified by an attribution system that detects patterns of an actor in the course of unauthorized and/or malicious activities.

SUMMARY

A biometric attribution approach identifies an actor remotely accessing a device based on timing between keystrokes entered on the device. Patterns tend to emerge in a timing interval between keystrokes entered by an actor. The keystroke patterns of an actor are analyzed to compute a typing model exhibited by the actor. Gathered or intercepted keystroke patterns of an unknown actor are compared to identify a likelihood that typing sessions emanated from a common actor across multiple cyber intrusions. Keystroke activity of a purported suspect actor can be compared to a database or model of keystroke attributes for determining if the keystroke activity emanated from the same actor as other keystroke sequences. Keystroke patterns rely only on the timing between keystrokes, as key data information of the actual key pressed need not be gathered since the comparisons rely only on keystroke timing intervals, or deltas.

In networked information systems, cyber criminals often carry out attacks through encrypted tunnels behind a network of proxy computers which makes attributing the perpetrator of a crime very difficult. However, a biometric typing model of the purported bad actor is obtainable through the timings of packets during transmission over the network. Pairs of encrypted packet
sequences can be compared to provide a prediction of whether or not the encrypted sessions belong to the same actor based on the typing "stylometry" exhibited by the timing deltas.

Configurations herein are based, in part, on the observation that cyber crime and general "bad actors" in an information system often gain access through authentication breaches based on a legitimate user. Single factor authentication mechanisms such as a password can be compromised simply by obtaining the trusted credential—the password. An attribution approach, however, examines actions independently of the entry point. The vantage point of an attribution system differs from that of an authentication system. In the authentication case, the vantage point is the login prompt or entry point, meaning that the code that collects keystrokes is running on the system that the actor is attempting to authenticate to. In the attribution case, the vantage point is anywhere along the connection between the actor and the system such that all the packets flowing between them can be observed.

Biometric approaches rely on immutable features that are difficult, if not impossible, to duplicate. Unfortunately, conventional approaches employing keyboard stylometry suffer from the shortcoming of reliance on the character value of the depressed key, and compute a keypress duration by gathering both downstroke and upstroke timing.

Accordingly, configurations herein substantially overcome the shortcomings of key data and key depression timing by gathering timing deltas of intervals between keystrokes and computing patterns of the timing deltas that are agnostic to the character value of the depressed key. Such frequency domain processing is useful in a console interface context, where a keyboard exchange via a network is employed for information system access. Network traffic includes packets of keystroke data, which may be encrypted. Keystroke data is identifiable by a packet size of a single keystroke, and includes a transmission time based on the keypress. The gathered keystroke sequence therefore includes only timing information of each keypress, as the data in the packet may be encrypted, and provides keystroke intervals defining a sequence of keypress deltas.

In a particular configuration, in a network device having a console access link with a user input device, a method of attributing malicious cyberactivity to an actor employing the remote station includes identifying a received keystroke entry, and identifying a successive keystroke entry. A console, SSH (Secure Shell), RDP (Remote Desktop Protocol) or other user access medium that receives the keystrokes from the user and allows an inter-keystroke interval to be computed or derived may be employed. A time interval is measured between the received keystroke entry and the successive keystroke entry, and thus accumulates a sequence of time intervals resulting from a plurality of successive keystroke entries. Information of the collective time intervals is used to determine, based on a pattern in the accumulated sequence of time intervals, a probability of an identity of an actor entering the keystrokes.

In the disclosed approach, actor attribution to a particular keyboard session relies on a learned model of frequency characteristics. In a computing environment having keyboard input devices operated by actors and responsive to keypresses on the keyboard for generating encrypted packets indicative of a respective keypress, the disclosed approach for assessing an identity of the actor includes receiving a sequence of packets from a console interface, such that each packet in the sequence of packets is based on a keystroke on a keyboard defining the console interface.

An analysis identifies attributes derived from a keystroke interval between each of the keystrokes based on capture of the sequence of packets containing the keystrokes, and compares the identified attributes to a second set of attributes based on a second sequence of keystrokes. From corresponding attributes in each sequence, analysis results in a probability that the keystrokes corresponding to the received sequence of packets and keystrokes corresponding to the second sequence of keystrokes emanated from the same keyboard actor.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIGS. 5A-5E show a machine learning (ML) example of training using vector quantities as in the example of FIGS. 4A-4B.

DETAILED DESCRIPTION

In the discussion that follows, an example of keystroke timing analysis presents a machine learning (ML) model trained on keystroke timing deltas from intervals between keystrokes of a training set of typing sessions, which is then used to attribute sequences of keystrokes to actors. Typing, or keystroke entry, exhibits a biometric pattern that emerges over a number of keyboard sessions for a given actor. The ML model is trained on these frequency characteristics to compute a probability of a common actor for two given keyboard sessions.

Figure 1:
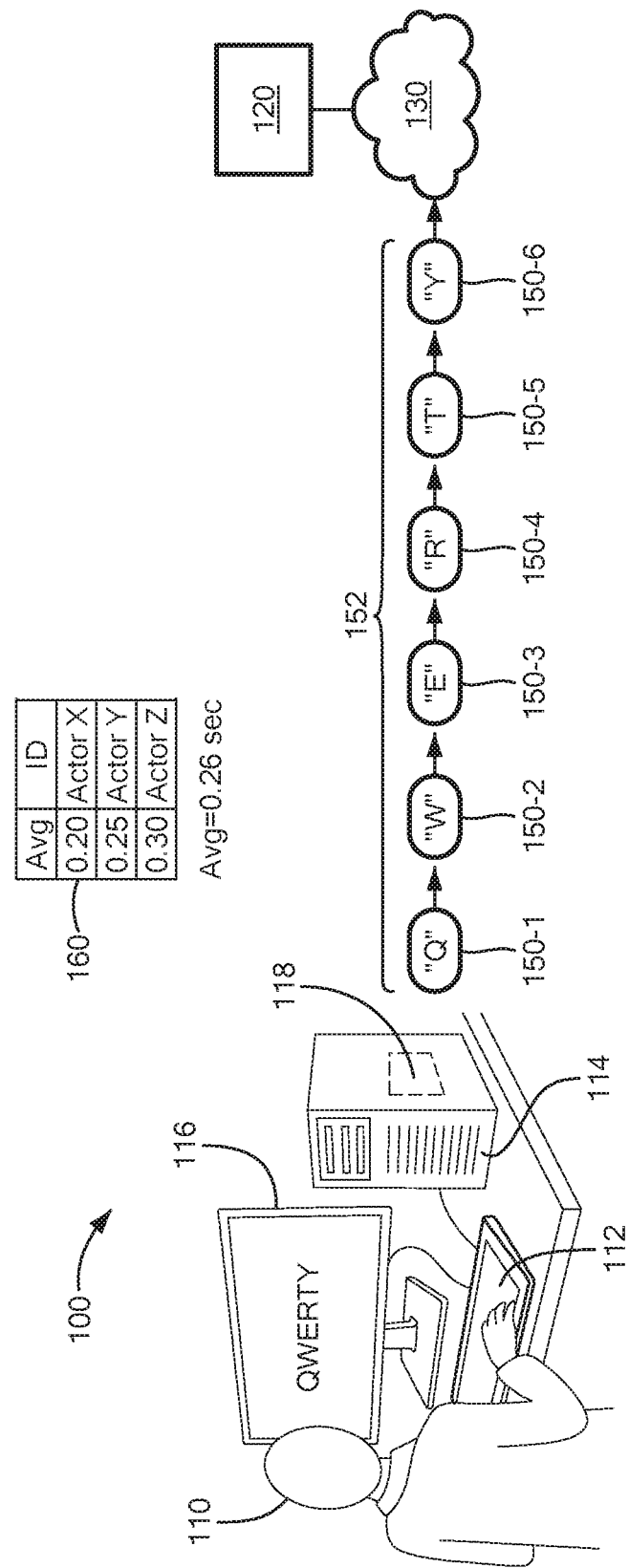
FIG. 1 is a context diagram of an information processing environment suitable for use with configurations herein.

FIG. 1 is a context diagram of an information processing environment suitable for use with configurations herein. Referring to FIG. 1, in a biometric attribution environment 100, actors 110 use keyboard-based entry for many tasks. In simplest form, in a network device having a console access link with a user input device, a method of attributing malicious cyberactivity to an actor includes identifying a received keystroke entry and a timing interval (delta) of successive keystroke entries. The actor 110 employs a keyboard 112 to enter alphanumeric characters received by a computing device 114 which are echoed on a visual rendering device such as a monitor 116. While many modern computing devices also employ a pointer type of input device such as a mouse in conjunction with a windowed graphical user interface (GUI), text-based entry of mnemonic commands is still employed in a command line form known as a console interface. This may take the form of the popular Remote Desktop Protocol (RDP), or other suitable terminal or network medium for keyboard exchange. While the computing device 114 may launch and execute applications locally, the computing device 114 exchanges information with a remote network location via the console interface.

Centralized computing systems rely on a central processing device, or host 120 in communication with the keyboard 112 and computing device 114 over a network 130. The console interface 118 transmits a character defined by each keystroke to the host 120, and receives replies in the form of characters for rendering on the monitor 116. The console interface 118 transmits keystrokes one character at a time in packets 150-1 . . . 150-N (150 generally) containing a value of the depressed key, typically based on an ASCII (American Standard Code for Information Interchange) code or similar mapping for alphanumeric character values.

In a secure system, the console interface 118 transmits the received keystrokes as packets 150 of encrypted characters to the host 120, often via tunneling. Such exchanges are typically accompanied by authentication appropriate to the access provided by the host 120. To hide their identities, cyber criminals often carry out attacks through encrypted tunnels behind a network of proxy computers, which makes attributing the perpetrator of a crime very difficult. However, an actor's biometric typing signature is obtainable through the timings of the packets 150 as they are sent through the network 130. Actor attribution includes computing a time interval between the received keystroke entry and the successive keystroke entries, therefore accumulating a sequence of time intervals resulting from successive keystroke entries. This allows a determination, based on a pattern in the accumulated sequence of time intervals, of a probability of an identity of the actor 110 entering the keystrokes.

Cyber defense organizations (e.g., incident response and cyber threat intelligence companies) generally perform two types of attribution to unmask these individuals and understand their motivations. One involves attributing activity on victim systems to specific cyber personas (e.g., social media account) and/or real-world identities. The other is concerned with attributing activity across victims to the same actors, regardless of whether their personas or identities are known. The approach herein facilitates the latter form of attribution. In other words, while we may not know the identity of an actor yet, we may attribute that whoever entered a keystroke sequence in Boston on Tuesday is the same as the person entering another sequence in New York on Thursday.

The information used to perform the attribution begins with forensic evidence and artifacts of the attack, derived from network traffic and compromised hosts, known in the industry as indicators of compromise (IOC). Traditionally, encrypted network traffic is not a rich source of IOC because the contents of the traffic cannot be observed by a third-party, since the characters in the packets 150 are encrypted. However, configurations herein are based on the observation that an actor's biometric typing signature can be recovered through the inter arrival time of the encrypted packets. The signature can be used to predict whether the encrypted sessions belong to the same user. Conversely, if a known signature can be obtained for a given actor, then the signature can be used to associate an unknown encrypted network session to a verified actor. The result is a network-based IOC that allows for the identification of common actors communicating over encrypted network sessions.

Conventional approaches to keyboard stylometry for user attribution typically require that the identifying keys (typed characters) are known. Configurations herein describe a system for performing user attribution, but with encrypted keystroke information where the character key data is unknown. This is done by generating features from the captured packets based on the timing deltas between packets and the frequencies at which they are sent. In other words, conventional approaches track patterns specific to particular keys, such as how long does "e" follow "a" in an "ae" pattern, or the interval between "c" and "h." The disclosed approach requires only the raw keystroke timing information, not the key data information. Further, some approaches identify both key-down and key-up time, allowing computation of a "dwell time" during which the key remained depressed. The sampled packets 150 have only one keypress time; dwell time is not available, and thus patterns are based only on the key delta time between keystrokes.

Returning to FIG. 1, the console interface 118 generates a sequence of keystroke packets 152 in a typing session. Beyond conventional password and value matching procedures, actor 110 authentication can employ a biometric authentication based on keystroke timing to derive and compare a "signature" of keystroke style. Timing intervals between depressed keys are indicative of a pattern that can be compared and matched to known patterns to determine typing sessions entered by the same actor. A pattern may be computed as a result of a recurring similarity in a duration of the accumulated time intervals based on a time associated with a transmitted packet for each of the successive keystroke entries.

In most information processing systems, keyboard entry is the standard entry medium for alphanumeric data, as mouse inputs can be cumbersome for character data and voice transcription can be unreliable. Further, a proficient keyboard operator can enter text almost as fast as spoken words. For example, a simple metric might employ an average keystroke time, and reference a biometric repository 160 including a table of average key delta times for known actors, using an example string "QWERTY." Each packet 150 includes key data and timing information, allowing a computation of a difference between the timing to yield the key delta. If an average key delta for the sequence is 0.26 seconds, a comparison with the repository 160 indicates that Actor Y, with an average of 0.25 s., is closest in contrast to Actor X with 0.20 s. and Actor Z with 0.30 s. Additional timing characteristics and frequency analysis may of course be undertaken and stored in the biometric repository 160, discussed further below.

Packets 150 may be captured by any suitable monitoring, sniffing or intercepting mechanism, generally capturing each transmitted packet through non-invasive monitoring of a communications line traversing the network 130 carrying the transmitted packet to the host 120. Packet interception occurs between a suitable destination computing device configured to receive and concatenate the keystroke entries into a command line for directing operation of the computing device. This may include a duplication or interception at the console interface, at the host 120, or at an intervening network device such as a router, hub or access point. Each transmitted packet 150 contains a value resulting from a single keystroke input action, which allows filtering of the received sequence of packets from other network traffic based on a frame size in the packet. Filtering and analysis is based on the frame size alone since the contained value remains undefined, as the character corresponding to the keystroke is an encrypted value and not needed for the timing delta computation.

Figure 2:
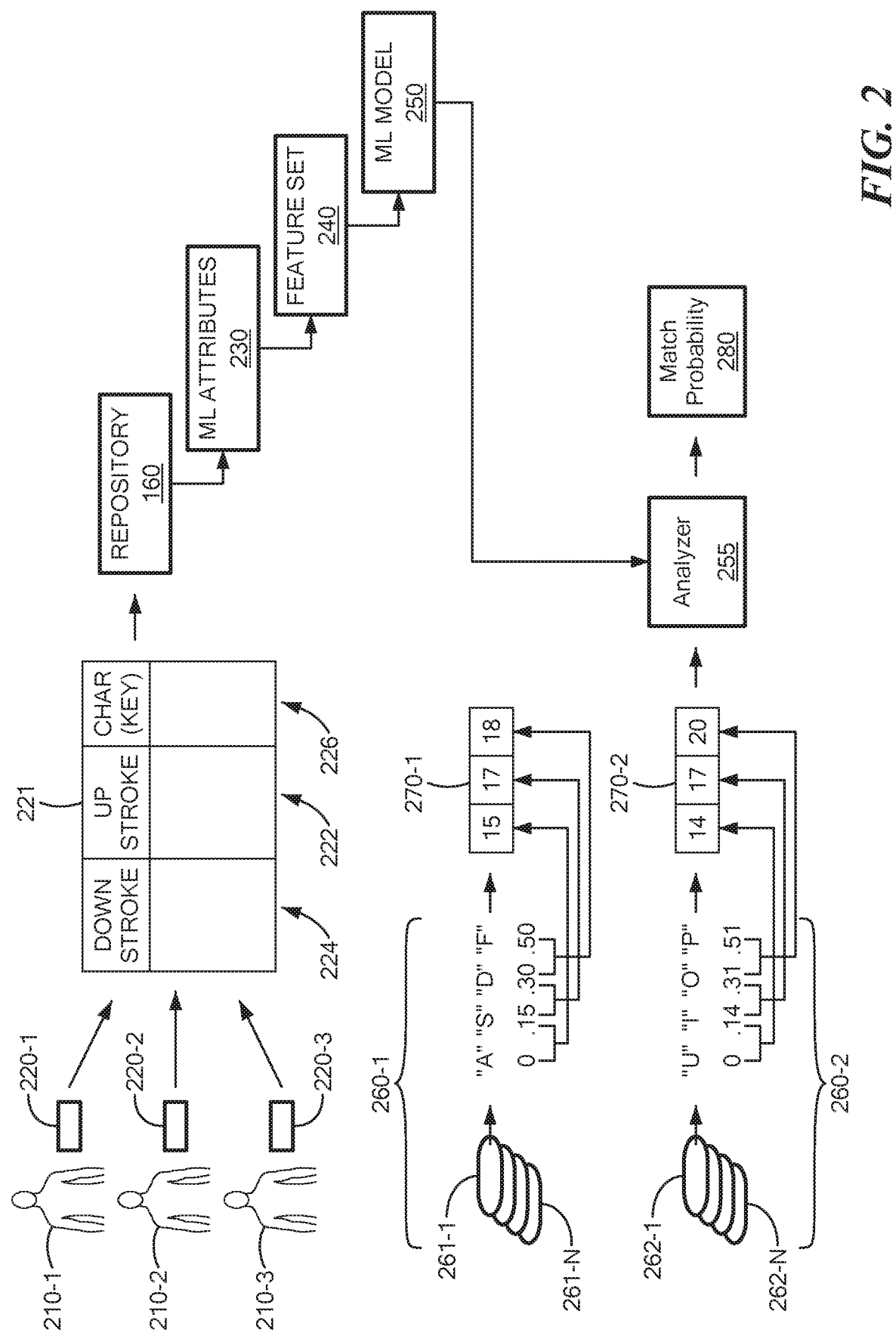
FIG. 2 is a data flow diagram for biometric attribution of typing stylometry in the environment of FIG. 1.

FIG. 2 is a data flow diagram for biometric attribution of typing stylometry in the environment of FIG. 1. Referring to FIGS. 1 and 2, a comparison of two separate keystroke sequences from the same actor results in matching or corresponding intervals between keystrokes. This involves comparison of the captured sequence from the unknown actor with a feature set based on known sequences stored in the repository 160 to identify similarities. Attributes or features are based on frequency patterns in the intervals that define a "signature" in typing stylometry. A machine learning (ML) model evaluates the signatures for a likelihood of belonging to the same actor as another signature.

Prior to assessing captured keystrokes of an unknown actor for identification, a comparison set is built by transforming a collection of known user keystrokes into a dataset that is representative of the encrypted keystroke traffic, which will later be employed to train and predict an ML model 250. Training a model for feature set matching based on timing and frequency attributes includes first gathering a representative data set. Data gathering may include publicly available datasets of typing sessions that are combined with a privately obtained supplementary dataset of keystrokes. Datasets originate from typing sessions 220-1 . . . 220-3 (220 generally) from sampled candidates 210-1 . . . 210-3 (210 generally), and are stored in a repository 160.

These datasets gathered for comparison and matching with the packet sequences 152 need to be normalized so that a subsequent matching is based on an "apples to apples" approach. Recorded keystrokes may be represented in a table 221, and typically contain the upstroke 222 and downstroke 224 information for each key-press. However, because a keystroke appears as a single packet in an encrypted tunnel, upstroke information is removed from the dataset. Also, character information 226 (i.e., information about which particular key was pressed) is stripped away so that the available information is comparable to the packets 150 of unknown data, since the packets 150 provide only timing information. Generally, either one of upstroke or downstroke information can be retained to generate the keystroke interval. Alternatively, other measurement such as packet arrival or transmission time, timestamp, etc. of each keystroke packet may be gathered, as long as a series of timing intervals between successive keystrokes may be assessed.

Generation of a filtered dataset 230 of attributes therefore involves removing downstroke 224 information to generate a sequence of intervals between each keystroke of a depressed key, and removing keystroke data 226 information indicative of a value associated with the depressed key for the upstroke and downstroke. The generated dataset 230 of attributes is based only on timing information between keystrokes, and so any suitable consistent interval may be employed, such as upstroke, downstroke, packet transmission, etc.

Once the relevant dataset 230 has been built, the next step is to transform these masked keystroke timings into salient features to provide to the ML model 250. This set of steps may include apportioning or "slicing" the masked keystrokes into sets of keystrokes of a predetermined length. The greater the length, the more information is available per sample, but it will diminish the size of the training dataset. Sequences having lengths of 24 and 48 tend to work well. The attributes may also be based on a sequence of keystrokes received from a sliding window of a predetermined length over keystrokes received in a typing session from an actor.

An inter-key timing delta is calculated to represent information about a user's typing pattern. The timing information includes timing deltas indicative of an interval between each keypress of the depressed keys. Aggregated statistics on these time deltas such as the standard deviation can be gleaned from statistical models. Additionally, analysis transforms the keystroke timings into the frequency domain to build a complimentary feature set 240. The keystroke timings yield a series of intervals or keystroke deltas employed further below to denote patterns of timing intervals between depressed keys over a predetermined number of keystrokes.

Training further includes generating a plurality of feature set pairs, in which the feature set pairs are based on keystroke sequences of a predetermined length; and building a model based on classifying a feature set as having a common origin as another feature set in the plurality of feature set pairs. Pairs of calculated feature sets are collected (some from the same user, some from different users) so that sample pairs may be classified as coming from the same user or separate users.

Traditionally, a biometric attribution system would attempt to match a new feature set with a particular user for which it has examples. In practice this is not very useful because it is unlikely that cyber actors would be part of the dataset 230 used for training. For this reason, we specifically train a model that matches pairs of user data and predicts whether they come from the same person. With this methodology, the ML model 250 extends to correlate or associate two unknown encrypted sessions, or a single known session with an unknown session, after the model has been trained.

The dataset 230 is employed to train a model based on features indicative of a typing stylometry based on a frequency of intervals between keypresses. This involves using the pairs of feature sets to train a machine learning algorithm that is capable of binary classification, such as through gradient boosted trees or neural networks, for example. At this point an ML model 250 which classifies samples as belonging to the same user has been generated.

Once the ML model 250 is trained to recognize timing attributes indicative of corresponding typing sessions, an identification/matching component may be invoked for the process of obtaining keystrokes from encrypted traffic channels and generating attribution predictions from the trained ML model 250. In interactive terminals, such as secure shell (SSH), every keystroke by a given user is immediately sent through the wire as a separate IP packet. However, there are many other packets that are sent as well and a filtering system is needed to accurately capture the packets of interest.

Beneficially, all keystroke packets in an SSH session are the same size and can be filtered from the stream of information based on the frame size. Sequences of keystroke packets are filtered from other network traffic based on a frame size in the packet. Feature generation techniques are applied as described above to feed the trained model. At this point the newly captured signature can be compared against a sample from a known user's typing session to determine the chance of a match. Alternatively, the newly captured signal can be compared against another unknown signature to determine the chance that two unknown signatures are from the same person.

Continuing to refer to FIG. 2, the ML model 250 is deployed to determine a probability of the identity of the actor based on a frequency of the keystrokes issued by the actor. This generally involves a first typing session 260-1 and a second typing session 260-2, and comparing the patterns of timing intervals resulting from the typing sessions for computing a probability that an origin of a first typing session matches an origin of a second typing session. Analysis of the typing sessions 260-1, 260-2 identifies attributes 230 derived from a keystroke interval between each of a plurality of keystrokes received from the keyboard based on capture of the sequence of packets 152 containing the keystrokes.

Each typing sequence 260-1 . . . 260-2 (260 generally) is based on keyboard input devices 112 operated by actors 110 and responsive to keypresses on the keyboard for generating encrypted packets 261-1 . . . 261-N (first typing sequence 260-1)) and 262-1 . . . 262-N (second typing sequence 260-2) indicative of a respective keypress. The sequence of packets is received from a console interface where each packet 261, 262 in the sequence of packets is indicative of a keystroke on the keyboard 112 defining the console interface 118.

An analyzer 255 demarcates a comparison sequence of a predetermined number of keystrokes for the identified attributes and the second set of attributes. In the first typing sequence 260-1, a character sequence for "a" "s" "d" "f" is typed and the second typing sequence 260-2 has characters for "u" "i" "o" "p," yielding four keystrokes for each. Since only the time deltas are needed, key data and upstroke/downstroke data is normalized into a vector for performing a comparison based on respective vectors based on identified attributes of each sequence. A first vector 270-1 and a second vector 270-2 are computed to denote a difference, or time delta between each keystroke. The times for the first typing sequence (starting from 0.0 s) is 0.15 s, 0.32 s and 0.50 s, resulting in vector values of 15, 17 and 18 hundredths of a second between keypresses. The second typing sequence has vector values of 14, 17 and 20 hundredths of a second between keypresses. For example, one comparison for a probability of the identity of the actor could employ a standard deviation in the sequence of time intervals for a predetermined number of keystrokes represented in the sequence of time intervals.

Further, any network latency due to packet propagation is deemed to be negligible, as timing information is expected to be sufficiently preserved in the packet stream.

The analyzer 255 invokes the ML model for attributes based on the time values in the respective vectors 270 to compare the identified attributes and compute a match probability 280 that the keystrokes corresponding to the received sequence of packets 261 and keystrokes corresponding to the second sequence of packets 262 emanated from the same keyboard actor. An identity of the actor need not be determined, and/or may be determined by other means, however even identifying that two typing sessions emanated from the same bad actor can be beneficial in attribution of actions to personas.

In implementation, comparing the identified attributes further comprises demarcating a comparison sequence of a predetermined number of keystrokes for the identified attributes and the second set of attributes, such as a series of a predetermined length or a sliding window. Each keystroke session results in a vector 270 having a sequence of elements such that each successive element in the sequence of elements represents a time interval from a previously pressed key. The analyzer 255 performs a comparison of respective vectors based on the identified attributes and the second set of attributes.

Figure 3:
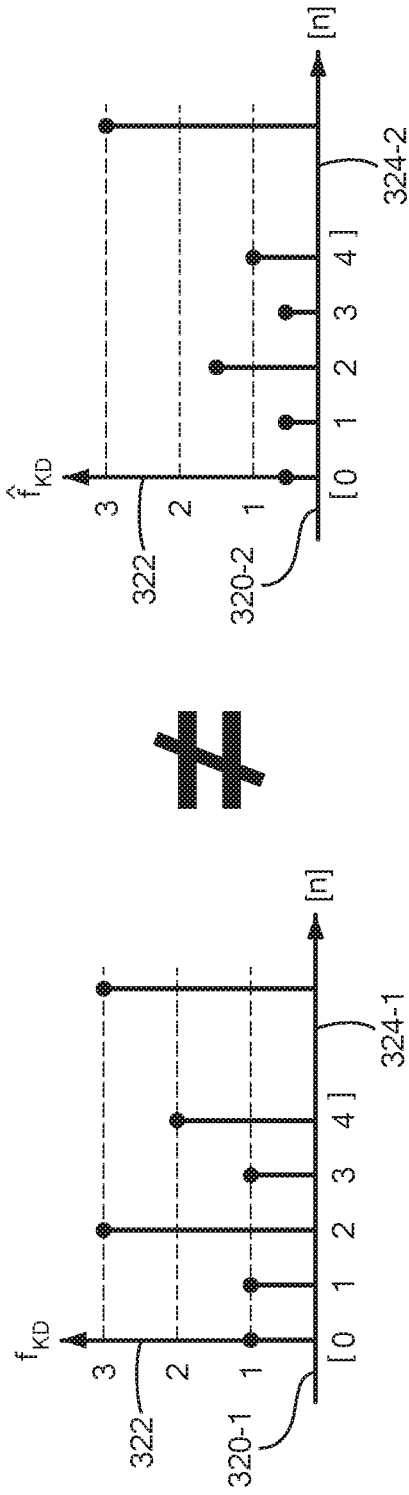
FIG. 3 shows an example of typing stylometry.

FIG. 3 shows an example of typing stylometry gather attributes 230 for generating the feature set 240 for comparison of typing sessions from different actors. FIG. 3 depicts a first typing sequence 310-1 and a second typing sequence 310-2 entered at twice the speed. Corresponding timing intervals 312-1 and 312-2 show the respective timing delta for each keypress. A respective graph 320-1 and 320-2 plots time on a vertical axis 322 and respective timing deltas on horizontal axes 324-1 and 324-2 (324 generally). Each element on the horizontal axis 324 shows a difference or delta for a keypress in the sequence. One of the notable attributes is demonstrated that the relative timing, or "shape" of the histogram has a similar visual profile. In attributing typing sessions to a particular actor, a comparison of the identified attributes includes a feature set comparison resulting from the gathering a plurality of typing session, such that each typing session in the plurality of typing sessions results from a sequence of keystrokes emanating from an origin.

Figure 4A:
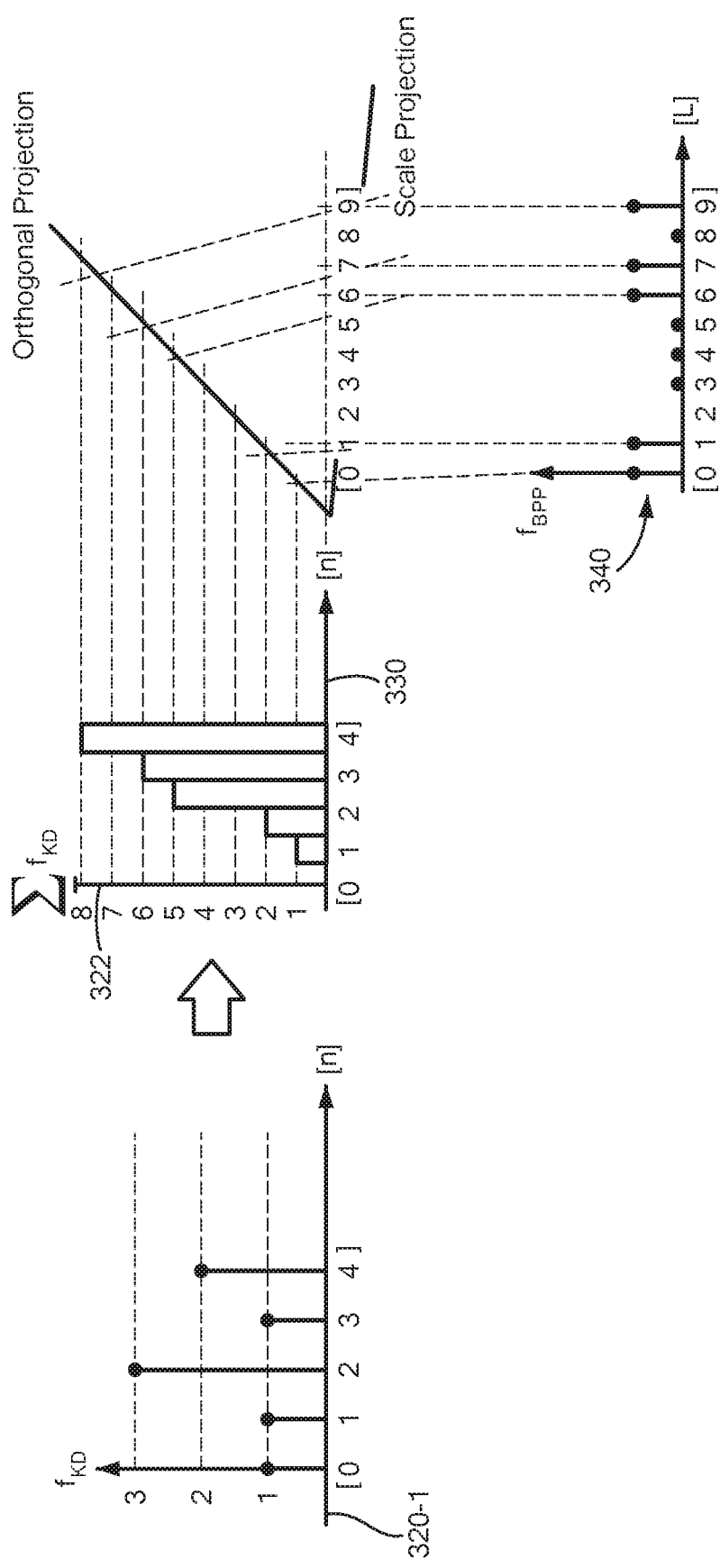
FIGS. 4A-4B show a comparison of typing stylometry in the example of FIG. 3.
Figure 4B:
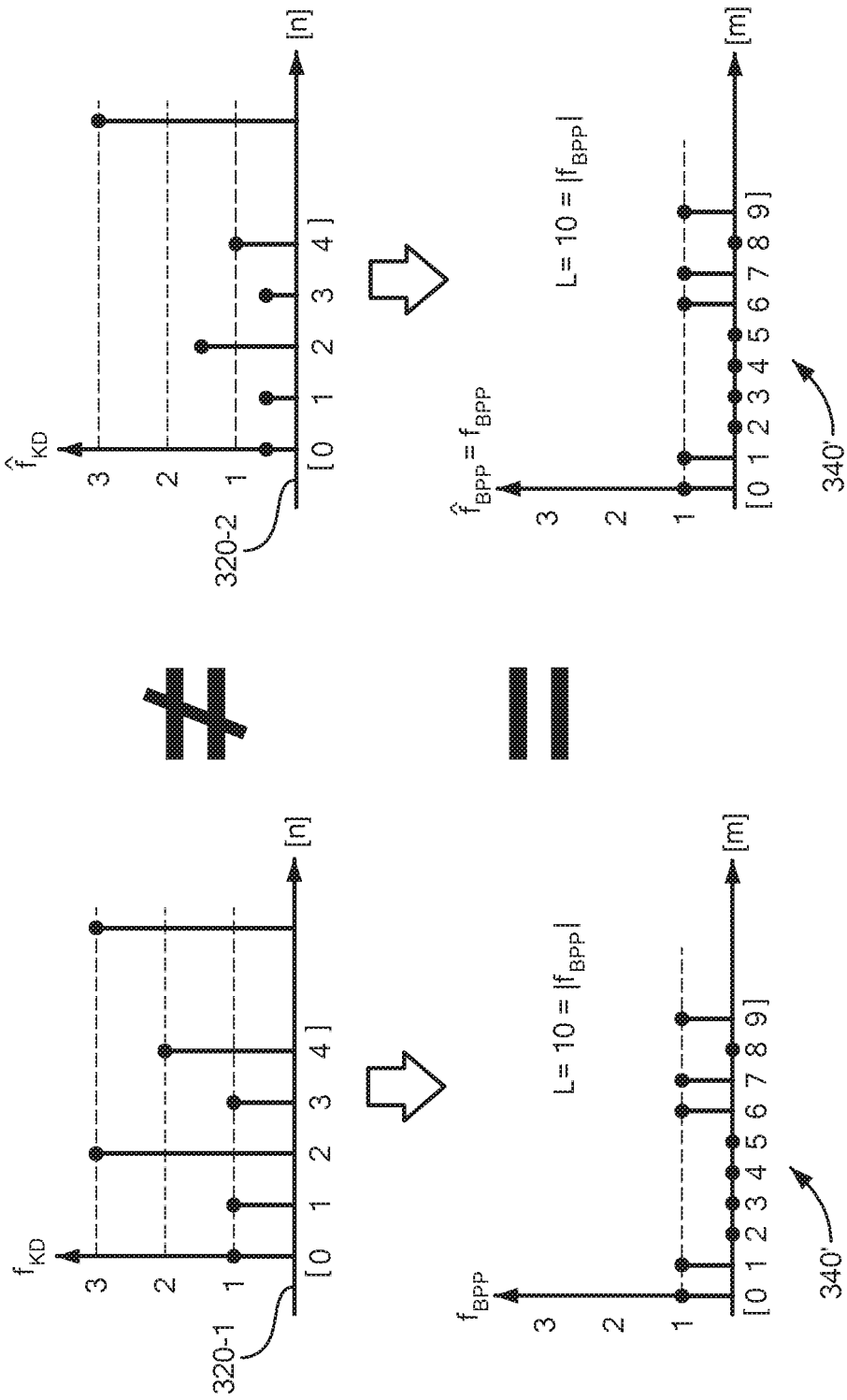

FIGS. 4A-4B show a comparison of typing stylometry in the example of FIG. 3. FIG. 4A depicts the timing intervals of graph 320-1 as binary proportional pulses. Such a comparison of identified attributes includes projecting the respective vectors to compute a series of binary proportional pulse based on equidistant, duration invariant time segments indicative of segments during which a key was pressed. The binary proportional pulses indicate during which of equal timed intervals a key was pressed. The graph 320-1 depicts timing deltas as a summation 330 of key deltas 332 showing accumulated time, which is projected onto a sequence 340 of which pulses incurred a keypress. Recall that the attributes are agnostic to the data (character depressed) in the keystroke or to upstroke and downstroke information.

FIG. 4B shows how the different timing intervals 320-1, 320-2 define features used to determine that a common actor typed both sessions by expressing the data as binary proportional pulses that are invariant with the overall duration, reflecting instead a relative similarity between keypresses. A slower typing sequence captured as graph 320-1 and a faster typing session 320-2 exhibit different values. A projection of each onto a respective binary proportional pulse representation 340', 340" shows a matching value that may be used to attribute both typing session to a common actor. One sequence may have been typed faster because the actor was in a more comfortable position or had a more accessible keyboard, while a slower keypress sequence may indicate that the actor was in an awkward position or had a different relative position to the keyboard. However, the relative timing between keystroke entry patterns emerged through attribute processing.

FIGS. 5A-5E show a machine learning (ML) example of training using vector quantities as in the example of FIGS. 4A-4B. A more detailed example of attribute and feature set processing is detailed in FIGS. 5A to 5E. FIGS. 5A-5E show an example using regression trees to extract and evaluate vector quantities obtained from home sale data for predicting, or attributing, cost estimates.

Figure 5E:
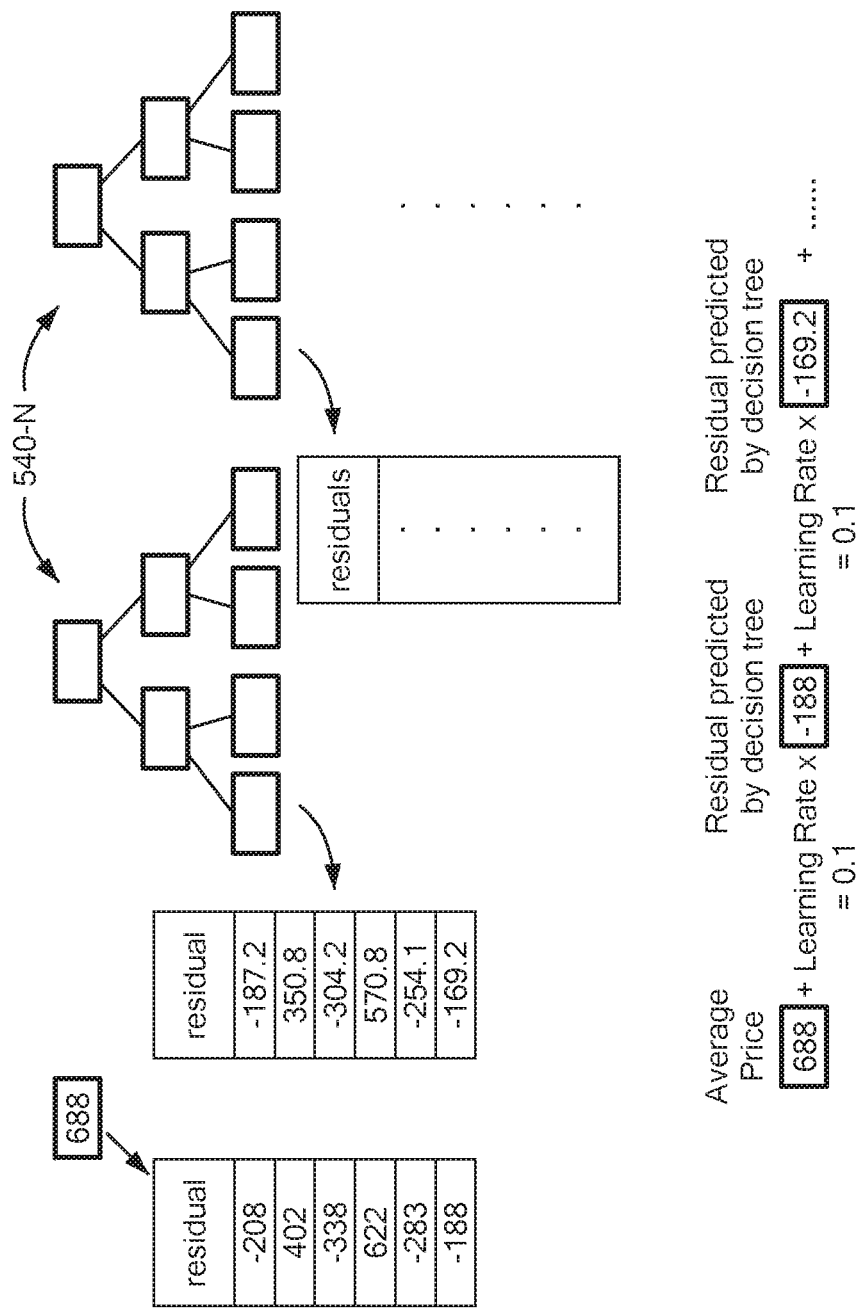

Referring to FIGS. 5A-5E, FIG. 5A shows a chart 501 of sales data, including age 502, square footage 504, location 506 and price 508, for each of a plurality of entries 510. In FIG. 5B, a chart 530 depicts residuals based on an average price are calculated for each entry 510. FIG. 5C shows generation of a decision tree 540 that predicts residuals based on square footage 504, location 506 and age 502 based on the chart 530, and constructs a revised decision tree 540'. The decision tree 540' is used to predict a target label using a plurality of trees constructed as 540 and 540', and used to compute new residuals, as shown in FIG. 5D.

Referring to FIGS. 5C-5E, iterate of the steps of FIGS. 5C-5E based on a number of estimators trains the model for improving accuracy using the constructed decision tress 540-N. Once trained, all of the trees may be employed for prediction of a target variable based on the accumulated forest of trees. Generally, accuracy is improved through additional iterations.

The foregoing is an example of a use of vector quantities as a predictor of a match or correspondence with other vector quantities. Other suitable matching approaches may be employed for comparing timing delta information gathered from two separate typing sessions and assessing a probability that the two sessions emanated from the same actor. It should be further noted that the match or correspondence need not rely on a known identity. A correspondence or match can indicate a common source (actor) of the typing sessions even if the actual identity is still unconfirmed, as the knowledge of a common actor producing both typing sessions is valuable.

Figure 6A:
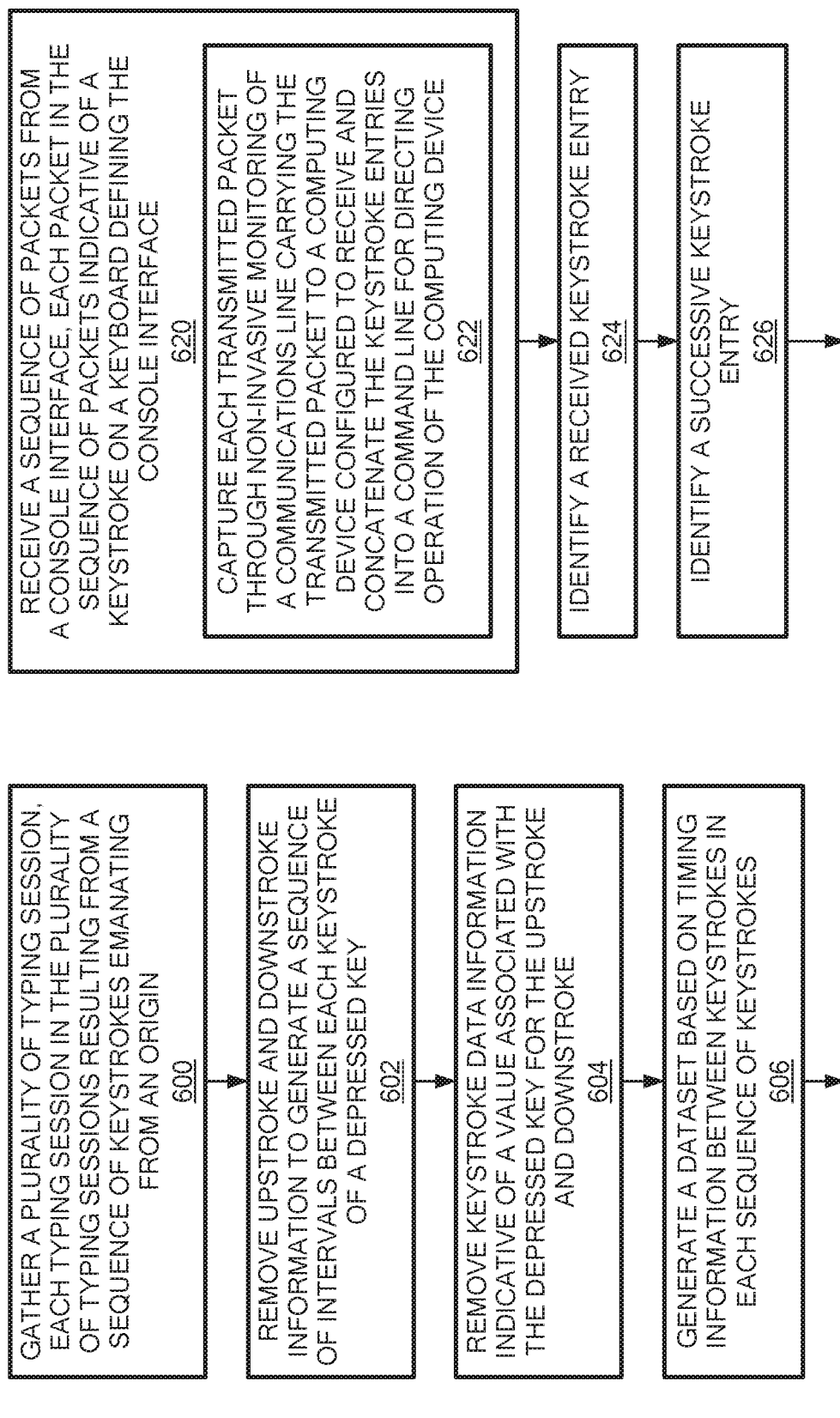
FIGS. 6A-6B are a flowchart of actor identification using the typing stylometry of FIGS. 2-5E.
Figure 6A:
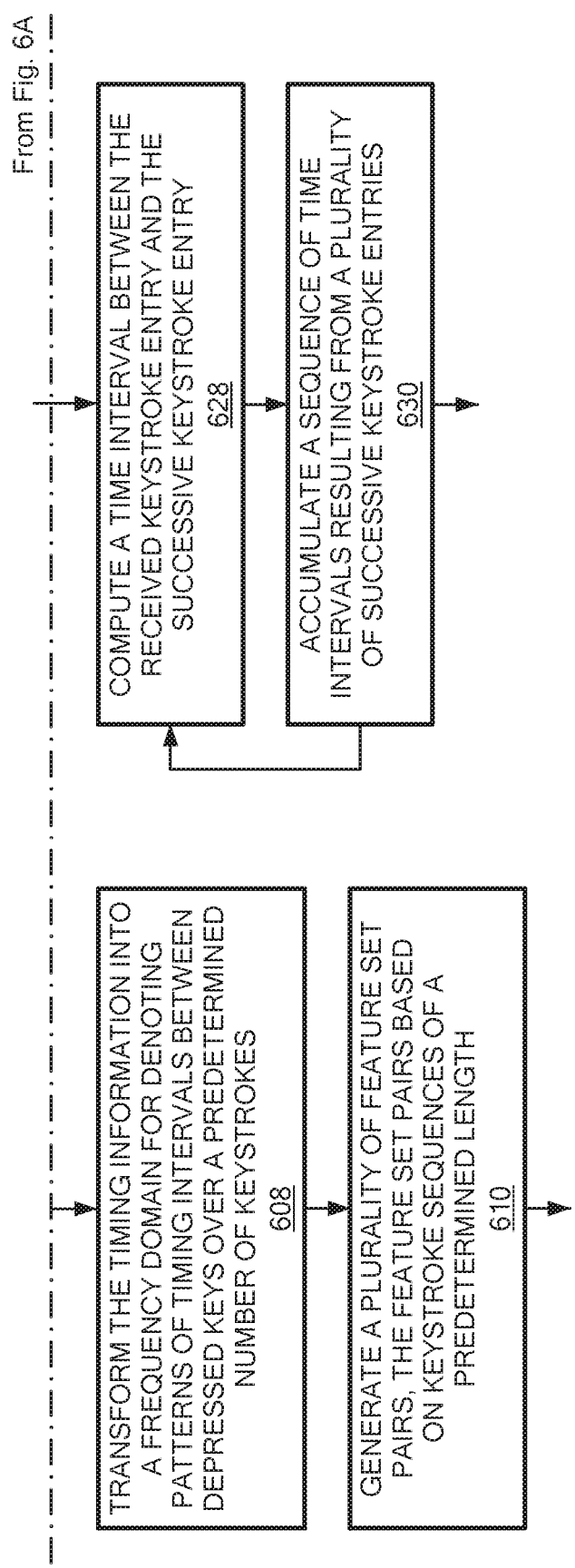
Figure 6B:
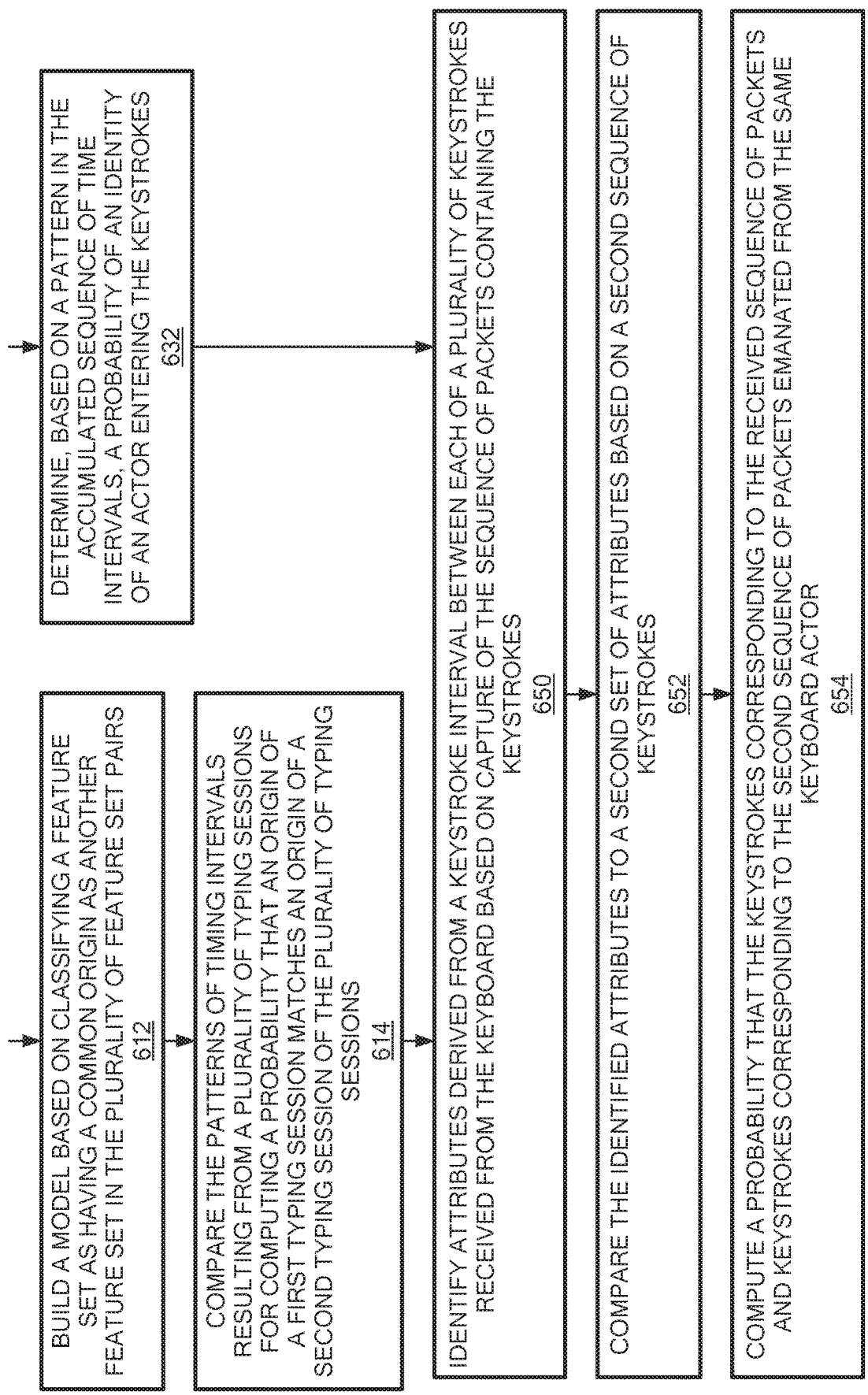

FIGS. 6A-6B are a flowchart of actor identification using the typing stylometry of FIGS. 2-5E. Referring to FIGS. 1-6B, the full actor attribution approach is shown from building and training the ML model 250 for keystroke timing frequency analysis and using that model for matching captured keystroke activities for which an actor identity or correlation is sought.

In the computing environment 100 having keyboard input devices operated by actors and responsive to keypresses on the keyboard for generating encrypted packets indicative of a respective keypress, the method of assessing an identity of the actor includes, at step 600, gathering a plurality of typing session for analysis. Each typing session in the plurality of typing sessions results from a sequence of keystrokes emanating from an origin. The origin or actor is not significant at this stage, as it is unlikely that an adverse actor would be included in the training set. Since these typing sessions are logged from various sources, it is important to remove upstroke information to generate a sequence of intervals between each keystroke of a depressed key, as depicted at step 602. Also, each keystroke input action includes a depress and release of a key corresponding to the received keystroke entry, as shown at step 604, thus keystroke data information indicative of a value associated with the depressed key for the upstroke is also removed. The result is a dataset based on timing information between keystrokes in each sequence of keystrokes, as depicted at step 606. The timing information is transformed into the frequency domain for denoting patterns of timing intervals between depressed keys over a predetermined number of keystrokes, as disclosed at step 608 The timing information at this stage only includes timing deltas indicative of an interval between each keypress of the depressed keys. Frequency information is employed to generate a plurality of feature set pairs based on keystroke sequences of a predetermined length, as shown at step 610. A variety of approaches may be employed, however a constant sized segment or sliding window allows comparison of like-sized data aggregations. At step 612 the model 250 is built based on classifying a feature set 240 as having a common origin as another feature set in the plurality of feature set pairs, in other words to identify which timing characteristics and features emerge from a typing stylometry of a given actor. The model 650 is then trained for comparing the patterns of timing intervals resulting from a plurality of typing sessions for computing a probability that an origin of a first typing session matches an origin of a second typing session of the plurality of typing sessions, as shown at step 614.

Resuming at step 620, actor attribution of a new, unknown keystroke sequence is performed using the now trained ML model 250. From a network device having a console access link with a user input device such as a keyboard, a method of attributing malicious cyberactivity to an actor includes receiving a sequence of packets from the console interface, such that each packet in the sequence of packets is indicative of a keystroke on a keyboard defining the console interface. A typical adverse actor may attempt to perpetrate bad acts using a remote console interface. This allows packet based communication with a central server or host. Often a first item would be a password, however the attribution approach may be employed with any sequence of typed characters.

For example, in one context, a password entry may be detected as emanating from an unauthorized actor because the timing between the keystrokes does not line up with the true password owner. In other contexts, an ongoing sequence of keystrokes is analyzed at any point in the typing session, either in real time or during subsequent forensic analysis.

Since the console interface employs transmitted packets for transmission of keypresses to a host/server, a sniffer, datalogger or suitable network appliance captures each transmitted packet through non-invasive monitoring of a communications line carrying the transmitted packet to a computing device configured to receive and concatenate the keystroke entries into a command line for directing operation of the host/server computing device, as shown at step 622. Packet capture based on a network medium provides and distinguishes access protection of a remote entity based on network packet observation for keystroke activity.

In basic terms, keystroke timing information is gathered by identifying a received keystroke entry, as depicted at step 624, and identifying a successive keystroke entry at step 626. The analyzer 255 computes a time interval between the received keystroke entry and the successive keystroke entry, as disclosed at step 628, and over the course of one or more typing sessions a sequence of time intervals accumulates resulting from a plurality of successive keystroke entries, as shown at step 630. Upon gathering a quantum of keystroke timing information suitable for comparison, the ML model 250 of steps 600-614 is invoked to determine, based on a pattern in the accumulated sequence of time intervals, a probability of an identity of an actor entering the keystrokes, as shown at step 632.

This includes identifying attributes derived from a keystroke interval between each of a plurality of keystrokes received from the keyboard based on capture of the sequence of packets containing the keystrokes, as shown at step 650, and comparing the identified attributes to a second set of attributes based on a second sequence of keystrokes via the ML model 250, as depicted at step 652. Based on the gathered and learned keystroke timing delta information, the ML model 250 computes a probability that the keystrokes corresponding to the received sequence of packets and keystrokes corresponding to the second sequence of packets emanated from the same keyboard actor, as shown at step 654. In this manner, a model of keystroke timing attributes is built and allows attribution of different keyboard sessions to the same actor based on patterns in the captured/intercepted keystroke intervals.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. In a computing environment having keyboard input devices operated by actors and responsive to keypresses on the keyboard for generating packets indicative of a respective keypress, a method of assessing an identity of the actor, comprising:
   receiving a sequence of packets from a keyboard interface, each packet in the sequence of packets indicative of a keystroke on a keyboard defining the console interface;
   identifying attributes derived from a keystroke interval between each of a plurality of keystrokes received from the keyboard based on capture of the sequence of packets containing the keystrokes;
   comparing the identified attributes to a second set of attributes based on a second sequence of keystrokes using a feature set comparison, generating the second set of attributes further comprising:
      gathering a plurality of typing sessions, each typing session in the plurality of typing sessions resulting from a sequence of keystrokes emanating from an origin;
      removing upstroke information to generate a sequence of intervals between each keystroke of a depressed key;
      removing keystroke data information indicative of a value associated with the depressed key for the upstroke and downstroke; and
      generating a dataset based on timing information between keystrokes in each sequence of keystrokes and the origin of the sequence of keystrokes; and
   computing a probability that the keystrokes corresponding to the received sequence of packets and keystrokes corresponding to the second sequence of packets emanated from the same keyboard actor.

2. The method of claim 1 wherein each received packet contains a value resulting from a single keystroke input action.

3. The method of claim 2 wherein the contained value remains undefined throughout determination of the probability.

4. The method of claim 2 wherein the keystroke input action includes a depress and release of a key corresponding to the received keystroke entry.

5. The method of claim 1 wherein computing the probability of an identity of the actor is based on a frequency of the plurality of the keystrokes.

6. The method of claim 1 wherein computing the probability of an identity of the actor is based on a model of features, the features including a standard deviation in the sequence of time intervals for a predetermined number of keystroke entries represented in the sequence of time intervals.

7. The method of claim 1 wherein the timing information includes timing deltas indicative of an interval between each keypress of the depressed keys, further comprising:
   generating a plurality of feature set pairs, the feature set pairs based on keystroke sequences of a predetermined length; and building a model based on classifying a feature set as having a common origin as another feature set in the plurality of feature set pairs.

8. The method of claim 1 further comprising:
transforming the timing information into a frequency domain for denoting patterns of timing intervals between depressed keys over a predetermined number of keystrokes; and
comparing the patterns of timing intervals resulting from a plurality of typing sessions for computing a probability that an origin of a first typing session matches an origin of a second typing session of the plurality of typing sessions.

9. The method of claim 1 further comprising receiving the packets from the console interface during transmission over a communication medium.

10. The method of claim 1 further comprising:
training a model based on features indicative of a typing stylometry based on a frequency of intervals between keypresses;
receiving keystroke timing information resulting from an intercepted typing session having an origin of an unknown actor; and
applying the model to the keystroke timing information for identifying a second typing session having the same origin as the intercepted typing session.

11. The method of claim 1 further comprising filtering the received sequence of packets from other network traffic to identify packets including a keystroke based on a frame size in the packet.

12. The method of claim 1 wherein the identified attributes are based on a sequence of keystrokes received from a sliding window over keystrokes received in a typing session from an actor.

13. The method of claim 1 wherein character data contained in the packet and indicative of a respective keystroke is encrypted and unavailable for analysis.

14. In a computing environment having keyboard input devices operated by actors and responsive to keypresses on the keyboard for generating packets indicative of a respective keypress, a method of assessing an identity of the actor, comprising:
receiving a sequence of packets from a keyboard interface, each packet in the sequence of packets indicative of a keystroke on a keyboard defining the console interface;
identifying attributes derived from a keystroke interval between each of a plurality of keystrokes received from the keyboard based on capture of the sequence of packets containing the keystrokes;
comparing the identified attributes to a second set of attributes based on a second sequence of keystrokes, comparing the identified attributes further comprising:
demarcating a comparison sequence of a predetermined number of keystrokes for the identified attributes and the second set of attributes;
generating a vector having a sequence of elements such that each successive element in the sequence of elements represents a time interval from a previously pressed key; and
performing a comparison of the respective vectors based on the identified attributes and the second set of attributes; and
computing a probability that the keystrokes corresponding to the received sequence of packets and keystrokes corresponding to the second sequence of packets emanated from the same keyboard actor.

15. The method of claim 14 wherein comparing the identified attributes further comprises:
projecting the respective vectors to compute a series of binary proportional pulse based on equidistant, duration invariant time segments indicative of segments during which a key was pressed.

16. A computer program embodying program code on a non-transitory medium that, when executed by a processor, performs steps for implementing, in a computing environment having keyboard input devices operated by actors and responsive to keypresses on the keyboard for generating packets indicative of a respective keypress, a method of assessing an identity of the actor, the method comprising:
receiving a sequence of packets from a keyboard interface, each packet in the sequence of packets indicative of a keystroke on a keyboard defining the console interface;
identifying attributes derived from a keystroke interval between each of a plurality of keystrokes received from the keyboard based on capture of the sequence of packets containing the keystrokes;
comparing the identified attributes to a second set of attributes based on a second sequence of keystrokes using a feature set comparison, further comprising;
generating the second set of attributes further comprises:
gathering a plurality of typing session, each typing session in the plurality of typing sessions resulting from a sequence of keystrokes emanating from an origin;
removing upstroke information to generate a sequence of intervals between each keystroke of a depressed key;
removing keystroke data information indicative of a value associated with the depressed key for the upstroke and downstroke; and
generating a dataset based on timing information between keystrokes in each sequence of keystrokes and the origin of the sequence of keystrokes; and
computing a probability that the keystrokes corresponding to the received sequence of packets and keystrokes corresponding to the second sequence of packets emanated from the same keyboard actor.

* * * * *